United States Patent [19]

Mollenkopf et al.

[11] 4,391,073

[45] Jul. 5, 1983

[54] MOVABLE PANEL ASSEMBLY

[75] Inventors: Lloyd C. Mollenkopf, Akeley; Daniel J. Branson, Prior Lake, both of Minn.

[73] Assignee: Rosemount Office Systems, Inc., Lakeville, Minn.

[21] Appl. No.: 215,692

[22] Filed: Dec. 12, 1980

[51] Int. Cl.³ ........................ G01K 11/04; E04B 2/82; E04H 5/00

[52] U.S. Cl. ........................ 52/241; 52/221; 52/239; 52/145; 52/126.4

[58] Field of Search ........................ 52/241, 242, 238.1, 52/220, 221, 239, 222, 145, 126.4, 122, 243.1, 365; 160/135, 131

[56] References Cited

U.S. PATENT DOCUMENTS

| | | | |
|---|---|---|---|
| 2,111,448 | 3/1938 | Hoffman | 160/398 |
| 2,235,761 | 3/1941 | Goldsmith | 52/241 |
| 3,605,851 | 9/1971 | Miles | 52/761 |
| 3,803,787 | 4/1974 | Daggy | 52/241 |
| 3,871,153 | 3/1975 | Birum | 52/239 |
| 3,949,827 | 4/1976 | Witherspoon | 52/241 |
| 4,119,287 | 10/1978 | Mollenkopf | 248/243 |
| 4,133,153 | 1/1979 | Hage | 52/242 |

*Primary Examiner*—Reinaldo P. Machado
*Attorney, Agent, or Firm*—Kinney, Lange, Braddock, Westman & Fairbairn

[57] ABSTRACT

A movable partition panel is made with a perimeter frame and supporting members for easily, quickly and in a low cost manner fastening and reinforcing braces in place and permitting the rapid installation of fabric to the outside of the panel.

6 Claims, 8 Drawing Figures

12
11
29
40
28
22
65
62
42
43
46
63
45
15
32
30
31
21
32
46
70
5
5
40
7
80
23
10
82
81
83
7

FIG. 2
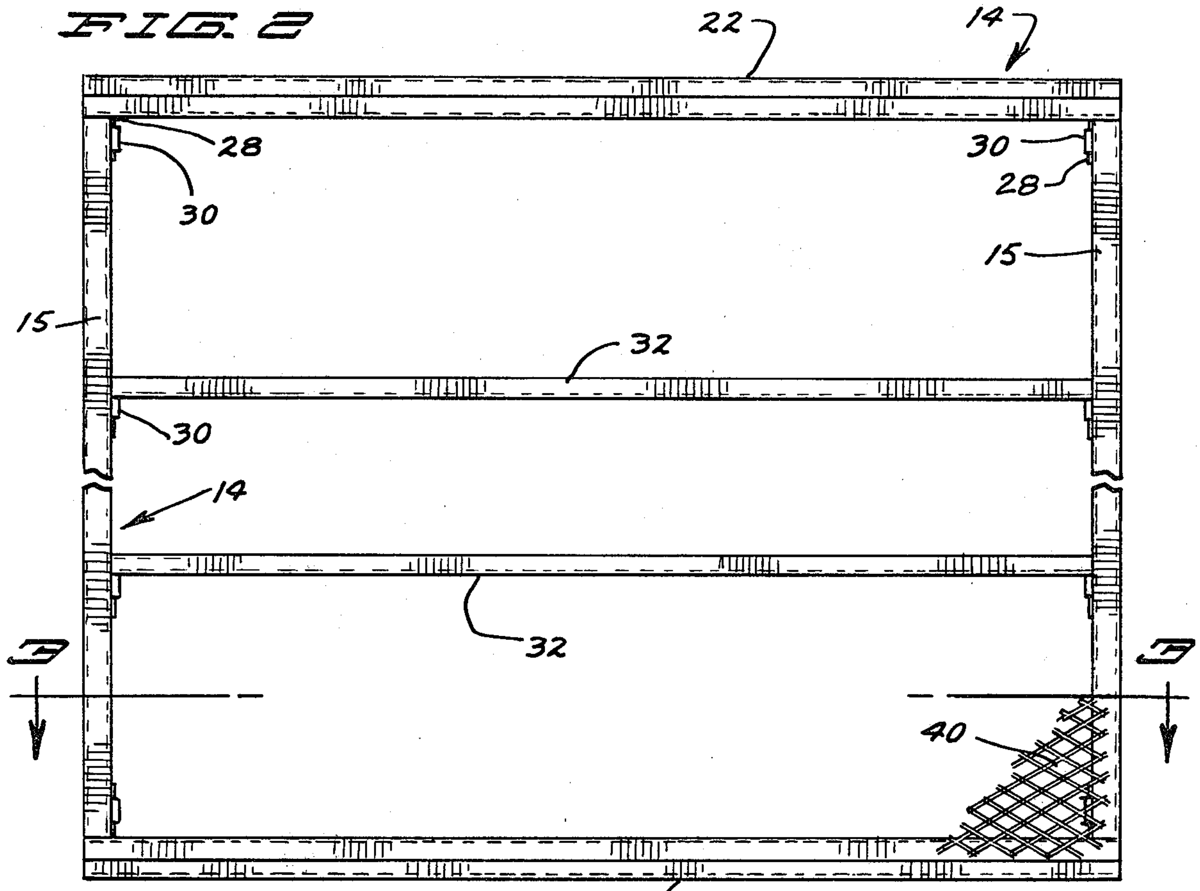
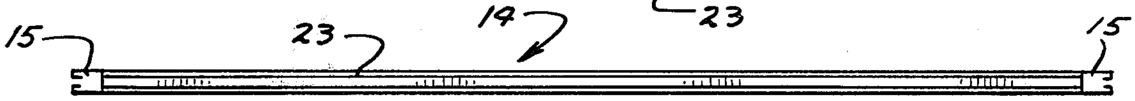
FIG. 3
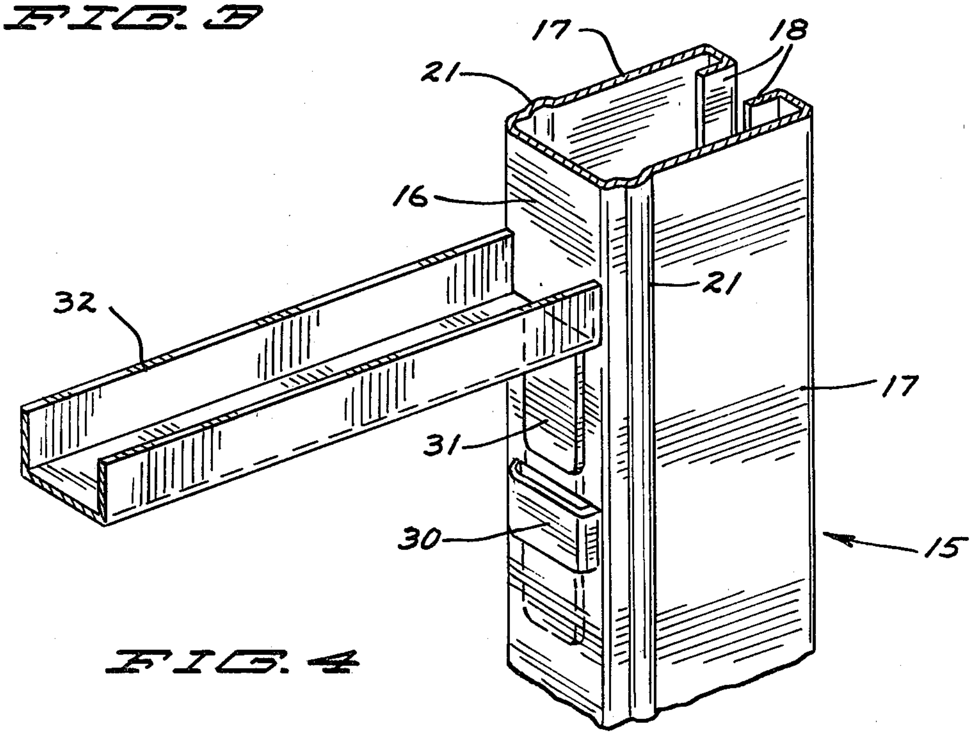
FIG. 4

MOVABLE PANEL ASSEMBLY

BACKGROUND OF THE INVENTION

1. Field of the Invention

The present invention relates to a panel construction, particularly for movable office partitions.

2. Prior Art

In the prior art, various divider screens or panels have been advanced. For example, U.S. Pat. No. 3,605,851 shows a type of panel construction which is multi-layered, utilizing at least one extrusion along the outer vertical edges for holding the support members in an assembly. FIGS. 6 and 7 illustrate a typical panel construction. However, sound absorption and strength have continued to be a problem in movable partitions or panels, and ease of fabrication, together with speed of assembly are desired goals.

SUMMARY OF THE INVENTION

The present invention relates to a panel construction which permits rapid assembly, has adequate space within a perimeter frame for sound absorbing materials, and provides means for rapidly attaching an outer fabric or other flexible covering over the core assembly.

The framework provides sturdy support for the panel and the individual interior components and permits supporting the panel on feet members from below the panel. The feet members are used for supporting a raceway having flexible side walls that may be hinged outwardly for access.

BRIEF DESCRIPTION OF THE DRAWINGS

FIG. 2 is a view of the frame construction utilized with the panel of the present invention;

FIG. 3 is a sectional view taken as on line 3—3 in FIG. 2;

FIG. 4 is the enlarged perspective view showing a vertical upright frame member and a cross member or rib in position to be assembled with the upright member;

DESCRIPTION OF THE PREFERRED EMBODIMENT

Figure 1:
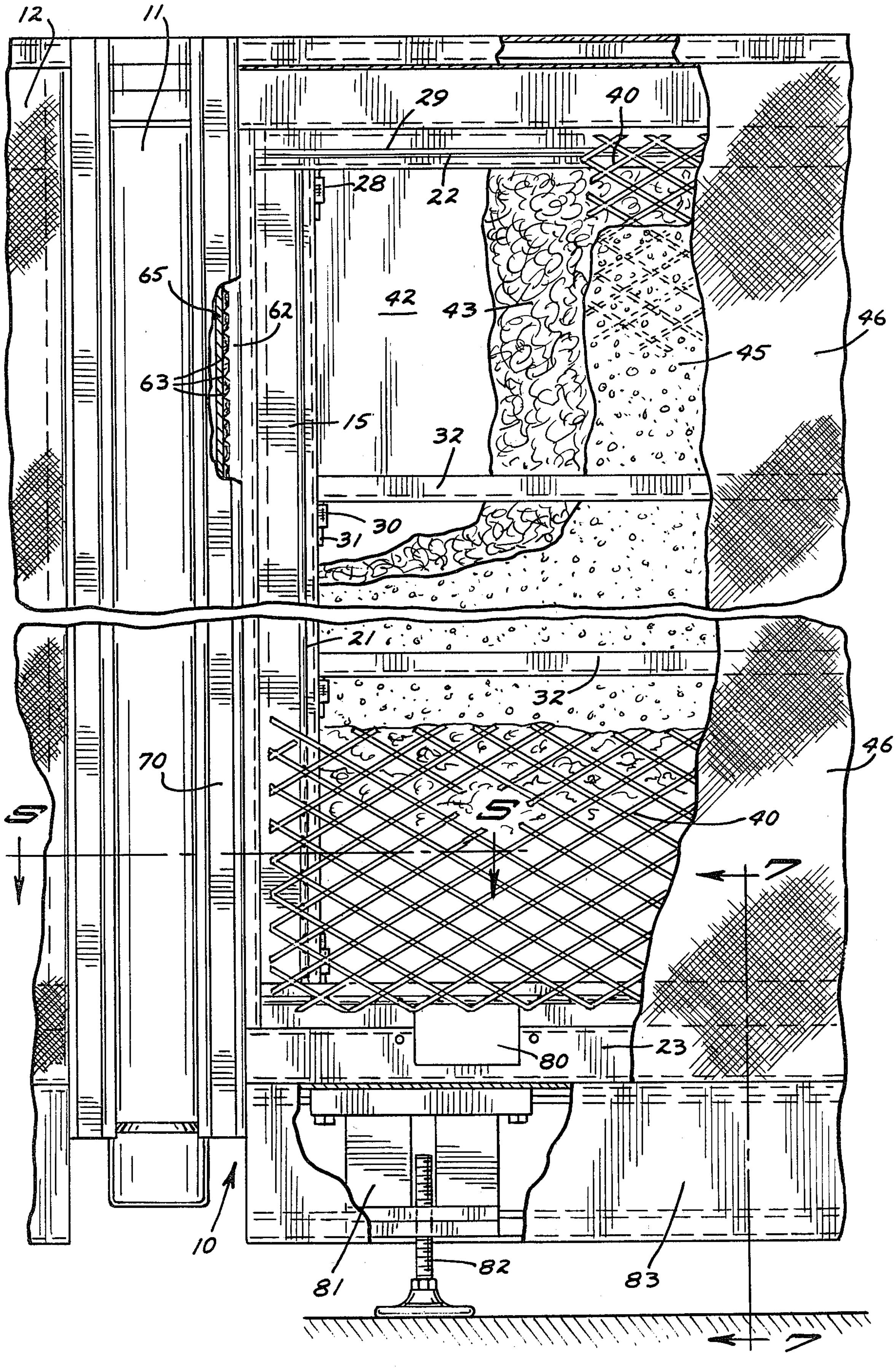
FIG. 1 is a fragmentary side elevational view of two panels made according to the present invention shown with a connecting post in position between the two panels, with parts and sections of parts broken away.

A panel construction illustrated generally at 10 made according to the present invention is shown installed relative to a center connecting post in a desired manner. The post 11, also supports a second panel 12 of similar construction.

The panels include a perimeter frame 14. Various interior materials can be utilized for noise and vibration control and the basic perimeter frame provides rigidity, ease of assembly and good performance. Perimeter frame 14 includes a pair of vertical channel shaped end members 15,15. These vertical end members have a base wall 16, side walls 17,17, and have inturned spaced, parallel wall portions 18 which define a central channel.

The side walls 17,17 have continuous ribs 21 formed along the length thereof.

Figure 7:
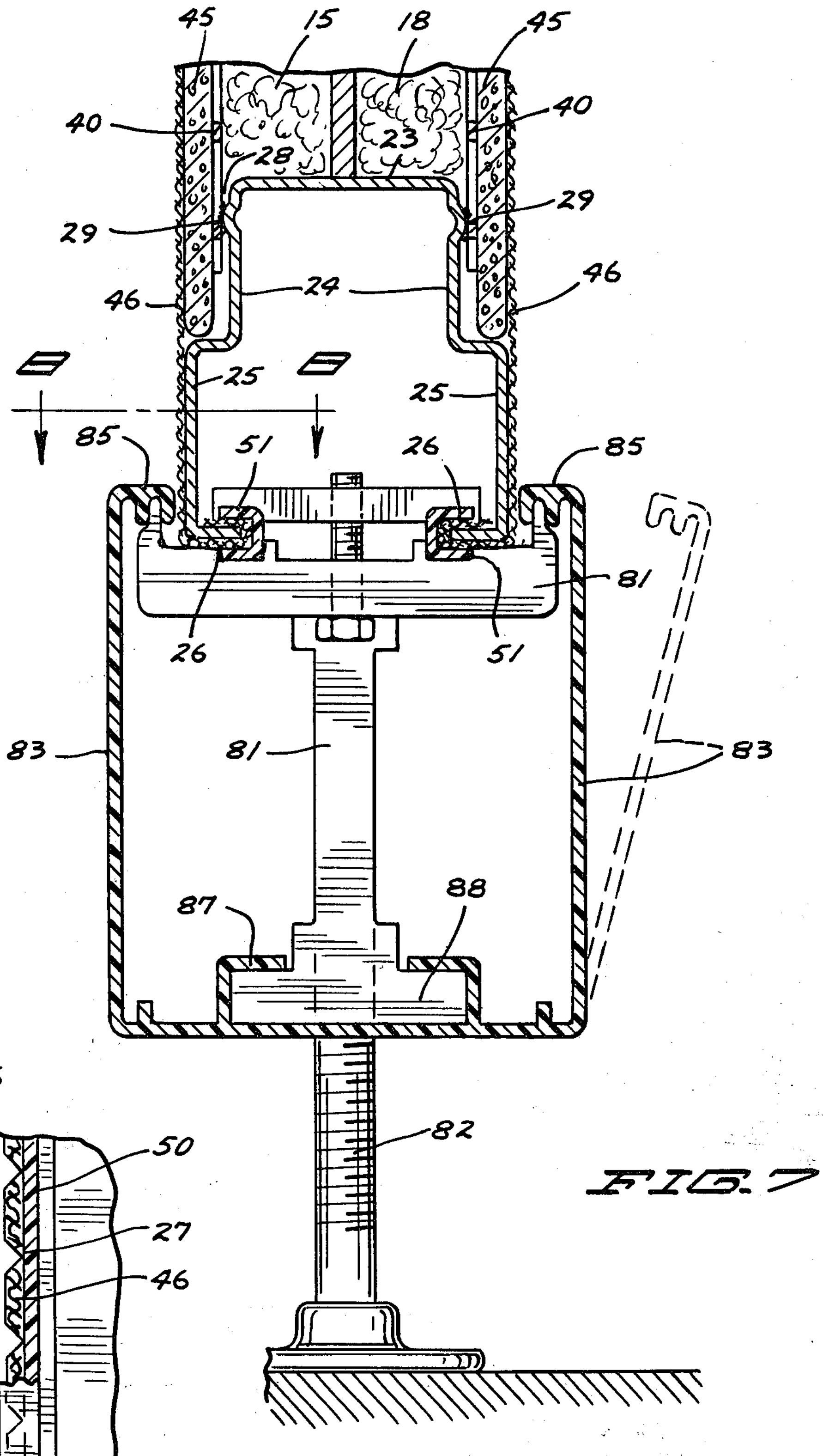
FIG. 7 is an enlarged sectional view taken as on the line 7—7 in FIG. 1.
Figure 8:
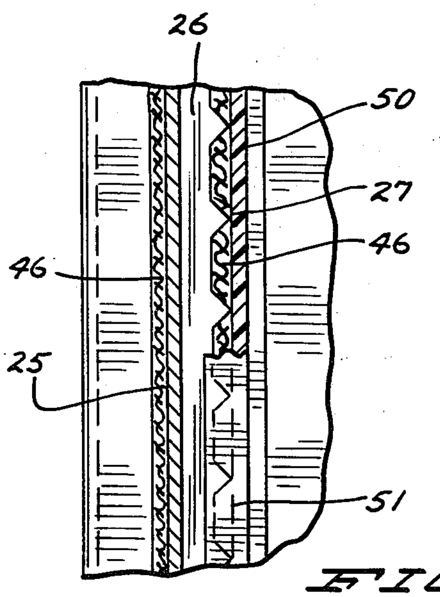
FIG. 8 is a sectional view taken as on line 8—8 in FIG. 7 with parts in section and parts broken away.

The vertical frame members are joined at the top and bottom by horizontal frame members 22 and 23, respectively, and these frame members are identical in cross sectional shape, as shown in FIG. 7. The members 22 and 23 have offset upper portions 24 which form a shoulder for the side panels. The members 22 and 23 also have lower side walls 25. At the lower ends of the side walls 25, there are inturned edges 26, which are serrated. The serrations form teeth as shown indicated at 27 in FIG. 8, spaced evenly along the length of the horizontal members. These teeth are sharp and flattened at their outer ends, and are used for retaining a fabric cover as will be more fully explained. Both the upper and lower horizontal frame members are substantially identical in cross section as previously stated, and both have the teeth extending along the longitudinal length of such members. The upper and lower edge frame members rest on the ends of the vertical frame members and have tabs 28 (FIG. 2) at the opposite ends which are bent out of the inner walls of the channels. The vertical frame members which are shown in FIG. 4 are provided with partially shear formed bands 30 forming receptacles along the wall 16, and positioned at desired intervals. The tabs 28 are held in the end receptacles 30. The intermediate bands 30 form pockets or receptacles into which tabs indicated at 31 of cross members 32 are placed for support. Thus, in the assembly, the top frame members and members 32 can be mounted in the vertical frame members by placing the tabs into selected pockets, for proper positioning, and after squaring, the tabs can be welded into place with a tack weld or a spot weld so that the members 32 and the vertical frame members form an assembly. The horizontal frame members also are attached to the vertical frame members with welds, to form the rigid perimeter frame 14 as shown in FIG. 2.

For lateral strength (into the plane of the panel), a sheet of expanded metal indicated generally at 40 is attached to the vertical and horizontal members of the perimeter frame on each side of the frame assembly. The expanded metal sheets 40 are attached by spot welding at desired intervals between the solid portions of the expanded metal sheets and the ribs 21,21 on the vertical frame members. Referring to FIG. 7, it can be seen that the upper and lower horizontal frame members also have ribs 29 formed in the walls 24. The sheets 40 of expanded metal are also spot welded to the ribs 29. Thus by having spot welds approximately every four inches along substantially the entire perimeter of the frame 14 a very rigid subframe is made.

As shown in FIG. 2, two or more cross members 32 can be used with the vertical frame members for support and stability, and in making the assembly, depending upon the degree of soundproofing desired, the perimeter frame 14 can be used for supporting a central divider of suitable thickness imperforate hardboard. The hardboard can be manually fitted into the open channel cross members 32, and then overlayed on either side with approximately one-half inch thick matts of fiberglass or other similar material. The hardboard and mats thus form a core for the panel which is positioned between the expanded metal sheets and is placed in the assembly before the expanded metal is spot welded to the perimeter frame members. This type of construction reduces sound transmission substantially, because the hardboard between the ribs provides for no open spaced for sound transmission from one side of the panel to the other.

After the core assembly has been made, including the hardboard imperforate panels 42, the fiberglass mats 43 layered over these hardboard panels, and the expanded metal attached to the frame on the outside of the fiberglass mat, the exterior surfaces of the panel, as well as the edge finishing, can be completed. In the form shown particularly in FIG. 5, a layer of cushioning material such as fiberglass or foam, indicated at 45, is placed over each of the expanded metal sheets 40, to provide a soft undercushion for an exterior fabric layer indicated at 46.

One of the problems in attaching fabric to this type of panel has been obtaining sufficient tightness, so that there are no wrinkles, and yet providing adequate fastening along the entire lengths of the panel perimeter. In this instance, the teeth 27 on the horizontal members are used for retaining the fabric in a taut or stretched condition by stretching the edges of the fabric indicated at 50 over the teeth on both the top and bottom of the perimeter frame, and on both sides of the panel, and then retaining the fabric edges 50 in place with suitable flexible "U" cross section clip members indicated at 51. For the horizontal members 22 and 23, the clips can be longitudinally extending channel shaped members which are made out of a plastic and provide a type of friction grip as they slip over the fabric layers and the teeth 27. The teeth 27 are sufficiently sharp so that they will hold the fabric in place under tension.

Figure 5:
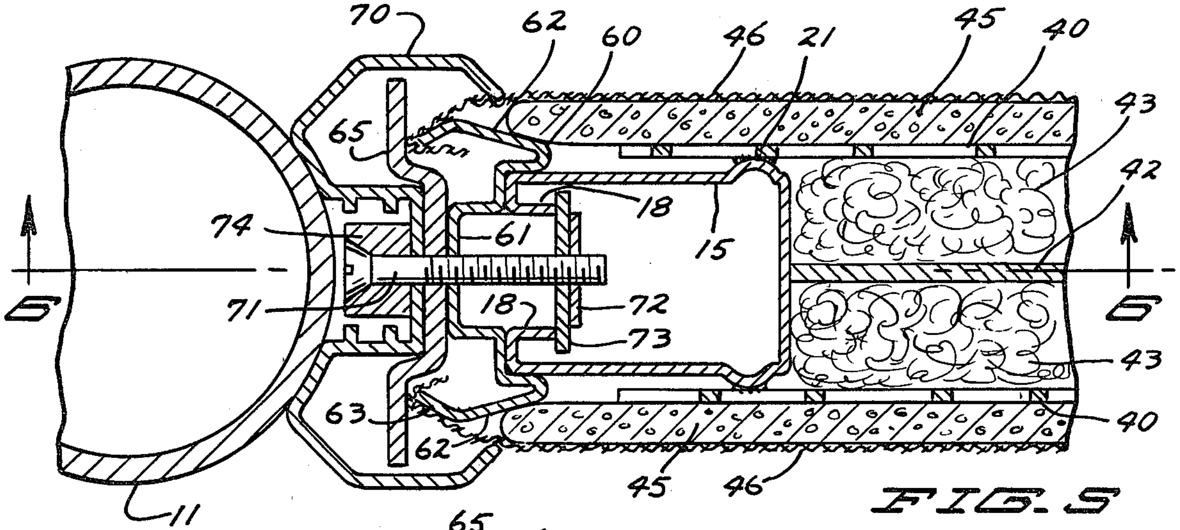
FIG. 5 is a sectional view taken as along line 5—5 of FIG. 1.
Figure 6:
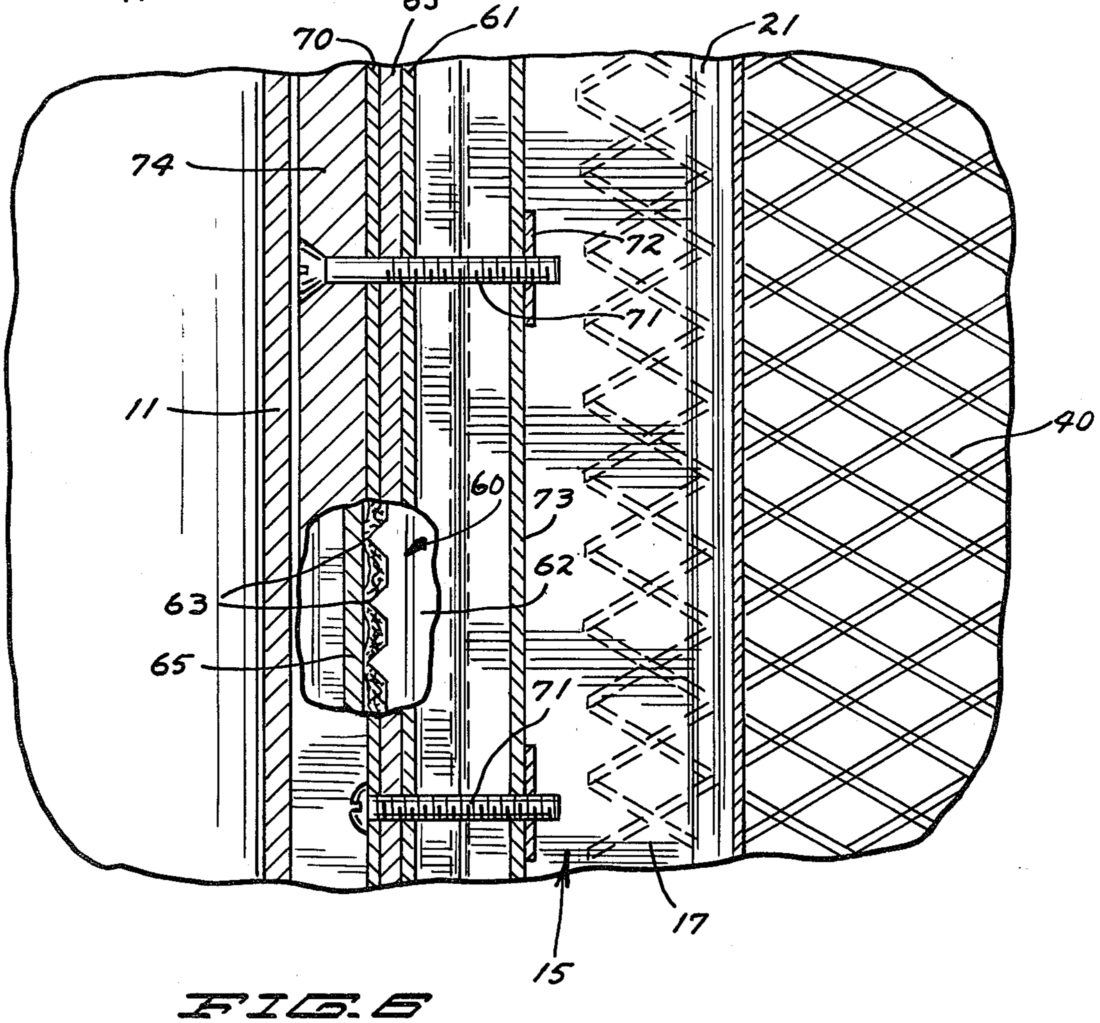
FIG. 6 is a sectional view taken as along line 6—6 of FIG. 5.

On the vertical edges, however, where it is necessary to connect one panel to an additional panel, the support post shown at 12 has to be accommodated. A fabric retaining anchor strip indicated generally at 60 is utilized. The anchor strip 60 is coextensive with the vertical frame members 15 on each end of the frame, and as shown the strip 60 has a base wall 61 that is shaped similar to a hat section which mates with the outer side edges of the vertical frame member wall 17,17. The outer edges of base wall 61 is joined to outer wing members or arms 62 that are positioned to the outside of the vertical frame member 15 and extend from the base wall in direction opposite from the panel. The anchor 60 and the vertical frame member 15 are clamped together so that they form an assembly as shown in FIG. 5. The outer ends of the arms 62 have a plurality of evenly spaced teeth 63 extending vertically along the length of the vertical frame members 15. The teeth 63 are similar to the teeth 27 utilized with the horizontal frame members. The edges of fabric along the vertical frame members can be pulled taut and lapped over the teeth 63, so that it will be retained by the teeth, which partially penetrate the fabric or at least provide anchor points for the fabric. A fabric retainer strip 65 can be placed in position against the outer surface of the wall 61 of the anchor strip 60, and as shown wall portions along the lateral side edges of the retainer strip 65 bear against the fabric that fits over the teeth 63. The edges thus will hold the vertical fabric edges in place so that it is anchored by the teeth 63. The edges of retainer 65 may also be used for anchoring accessories such as desk tops, shelves and the like as shown in U.S. Pat. No. 4,119,287.

The assembly also includes a vertical channel member 70 which forms a shield mating with the post 11, is placed over the anchor strip, and the entire assembly is then fastened relative to the vertical frame member 15 with a plurality of screws 71, spaced vertically along the frame members which thread into provided weld nuts 72 on a nut strip 73 that is slipped inside of the frame member 15, and which abuts against the edge portions of the inturned walls 18 of the frame member 15. By tightening down the screws 71 the fabric retainer is clamped against the fabric edges where they overlie the teeth 63, and additionally the anchor strip 60 and outer shield channel 70 are securely held in place.

As shown, a support block 74 can be provided adjacent the upper edges of the panel and used as an anchor for holding the panels relative to the post 11. If desired, the interior layers of the panels can be eliminated (on the interior of the sheets 40), but the toothed fabric anchors would be utilized whether or not the central core members are included. The center hardboard sheet is not always used, and in some instances outer hardboard sheets may be bonded to the perimeter frame instead of expanded metal. The resilient layer 45 may be provided over the outer hardboard, and the fabric attached around the perimeter of the frame utilizing the teeth.

The frame construction provides for a unique way of holding in place a bottom raceway that can be used for communication cable, and at the same time the horizontal frame member can be used for electrical outlets if desired. As shown in FIG. 1, an opening indicated at 80 is of size so that it will receive an electrical outlet, and this is raised above the teeth members 27, and the receptacle is thus held above the bottom of the metal bottom frame members. A suitable support foot 81 can be fastened to the bottom frame member 23 with suitable clamp bolts which clamps the support foot into position (see FIG. 7) and an adjustable foot 82 can be threaded through the support foot 81. A bottom extruded raceway channel 83 made of plastic can be snapped over the edges of the metal member support foot as shown in FIG. 7, and retained in place by the support foot 81. Note that the raceway 83 has lip members 85 which fit into grooves in the upper edges of the support foot 81 and snap in place, while at the lower wall of the raceway 83, the support feet 81 slide into provided overhanging ledge members 87 as shown. The raceway housing thus forms an enclosure in cooperation with the lower frame member. The lower wall of the raceway is supported on the support feet.

Only two such support feet are needed for supporting a panel member and two support feet 81 will adequately hold the raceway in working position. The plastic raceway is used for communication equipment. The panels may also have prewired electrical raceways at the top edges thereof to provide for prewired panels that have electrical outlets.

What is claimed is:

1. A movable panel assembly comprising a frame defining a perimeter and including generally vertical frame members and a generally horizontal lower frame member:

support means operable to hold said frame members in an assembly defining an interior space;

said vertical frame members comprising channel shaped members having a base and side walls, the sidewalls having inturned ends spaced from the base and defining an opening facing away from the space defined by the perimeter frame;

sheet means extending across said space to form a support resisting forces perpendicular to the plane of the perimeter frame;

a layer of fabric over said sheet means;

retainer means on each of the edges of the frame members comprising a plurality of teeth extending in direction relative to the frame so that edge portions of the fabric layer placed over the teeth under tension are retained by the teeth, and a pair of support feet mounted on the lower horizontal frame member, a raceway having a lower wall and hingedly attached side walls, means to mount the lower wall of the raceway to the support feet with the raceway side walls extending upwardly to position adjacent the lower frame member to form an enclosure in cooperation with the lower frame member, said raceway side walls having inturned side edges adjacent the lower frame member, and cooperating grooves and lip means acting between the inturned edges of the raceway sidewalls and the support feet to releasably retain the raceway sidewalls uprightly on the support feet.

2. The movable panel assembly of claim 1 wherein the perimeter frame comprises metal frame members having raised ribs on the sides thereof, said sheet means including expanded metal sheets welded to the ribs on opposite sides of the frame members.

3. The movable panel assembly of claim 1 wherein said sheet means includes a separate sheet member fastened to the perimeter frame on each side thereof, and a layer of resilient material positioned to the exterior of each of the sheet members.

4. The movable panel assembly of claim 1 wherein the vertical frame members having straps forming receptacles on the base of the vertical frame members facing inwardly toward the defined space, and a plurality of cross members extending between the vertical frame members, said cross members having tabs which fit into the receptacles and which are retained by the straps for assembly.

5. In a panel construction for movable panels having a perimeter frame, including a generally horizontal lower frame member, the improvement comprising support feet members, means to clamp said support feet members to said lower frame member at spaced locations thereon, and a raceway housing comprising a bottom wall, and upright side walls means on said bottom wall to permit said raceway housing to be supported on the lower portions of said support feet members, said side walls extending generally uprightly from said bottom wall and being hingedly attached thereto, and cooperating lip and groove means between the support feet members and the side walls adjacent the upper edges of said side walls to permit releasably latching said side walls to said support feet members when the support feet members are clamped in place on said lower frame member.

6. The combination as specified in claim 5 wherein said side walls have upper edge portions generally parallel to the bottom wall and extending inwardly toward the lower side frame members, said cooperating groove and lip means being formed on said inturned portions and said support feet members.

* * * * *